United States Patent [19]

Sawyer

[11] Patent Number: 5,978,677
[45] Date of Patent: Nov. 2, 1999

[54] MIGRATION OF ROUTING NUMBER SELECTION TO THE BASE STATION CONTROLLER OF A CELLULAR TELEPHONE NETWORK

[75] Inventor: Francois Sawyer, St-Hubert, Canada

[73] Assignee: Telefonaktiebolaget L M Ericsson (publ), Stockholm, Sweden

[21] Appl. No.: 08/758,209

[22] Filed: Nov. 26, 1996

[51] Int. Cl.$^6$ .............................. H04Q 7/22; H04Q 7/38
[52] U.S. Cl. ........................................ 455/432; 455/445
[58] Field of Search .................................... 455/432, 433, 455/445

[56] References Cited

U.S. PATENT DOCUMENTS

| 5,036,531 | 7/1991 | Spear | 455/445 |
| 5,260,987 | 11/1993 | Mauger | 455/560 |
| 5,333,178 | 7/1994 | Norell | 455/461 |
| 5,422,935 | 6/1995 | Spear | 455/445 |
| 5,832,382 | 11/1998 | Alperovich | 455/433 |

FOREIGN PATENT DOCUMENTS

| 0 462 727 | 6/1991 | European Pat. Off. . |
| 0 696 153 | 2/1995 | European Pat. Off. . |
| WO 96/26617 | 8/1996 | WIPO . |

OTHER PUBLICATIONS

PCT Search Report, Jul. 29, 1998, PCT/SE 97/01978.

*Primary Examiner*—Andrew M. Dolinar
*Attorney, Agent, or Firm*—Jenkens & Gilchrist PC

[57] ABSTRACT

Responsive to receipt at an originating switching node of an incoming call, a location request (send routing) message is sent to the home location register for the called mobile station. A routing request (provide roaming) message is then sent from the home location register to the switching node identified by the home location register as currently serving the called mobile station. The serving switching node then sends a routing number request message to the base station controller currently serving the called mobile station. The base station controller then assigns an appropriate one of its routing numbers, and responds back to the originating switching node via the home location register and the visited switching node with the assigned routing number. The assigned routing number is then used to establish a trunk connection between the originating switching node and the base station controller for purposes of effectuating call delivery. Alternatively, the serving switching node makes the selection of the base station controller assigned routing number.

26 Claims, 8 Drawing Sheets

MIGRATION OF ROUTING NUMBER SELECTION TO THE BASE STATION CONTROLLER OF A CELLULAR TELEPHONE NETWORK

BACKGROUND OF THE INVENTION

1. Technical Field of the Invention

The present invention relates to cellular telephone networks and, in particular, to the terminating call routing process performed within a cellular telephone network.

2. Description of Related Art

Operation of a cellular telephone network to handle an incoming call dialed to a cellular subscriber mobile station is well known. Responsive to receipt at an originating (or gateway) switching node of the incoming call dialed to a mobile station, a location request (send routing) message is sent to the home location register for the dialed mobile station. The home location register then identifies a switching node currently serving the dialed mobile station. A routing request (provide roaming) message is then sent from the home location register to the serving (or visited) switching node to prepare for delivery of the call. The serving switching node determines to some degree the location of the called mobile station (based perhaps on information resulting from a recent registration or paging attempt), assigns an appropriate routing number (for example, a temporary location directory number or a roaming number) for that location, and responds to the home location register with the routing number. The assigned routing number is then forwarded to the originating switching node where it is used to establish a trunk call connection between the originating switching node and the serving switching node to deliver the incoming call to the dialed mobile station. Delivery of the call to the mobile station is then accomplished by establishing a trunk connection with a base station controller connected to a base station currently serving the mobile station. A radio frequency communications link is then established between the base station and the mobile station.

SUMMARY OF THE INVENTION

The present invention comprises a method and apparatus for more efficiently performing the terminating call routing process within a cellular telephone network. Responsive to receipt at an originating switching node of an incoming call dialed to a mobile station, a location request (send routing) message is sent to the home location register for the dialed mobile station. The home location register processes the request to identify a switching node currently serving the dialed mobile station. A routing request (provide roaming) message is then sent from the home location register to the serving (or visited) switching node to prepare for delivery of the call. The serving switching node identifies the base station controller currently serving the called mobile station (based perhaps on information resulting from a recent registration or paging attempt), and transmits a routing number request message to that base station controller. The base station controller then assigns an appropriate one of its routing numbers (for example, a temporary location directory number or a roaming number), and responds back to the originating switching node via the home location register and the visited switching node with the assigned routing number. The assigned routing number is then used to establish a trunk connection between the originating switching node and the base station controller by-passing the serving switching node. Completion of call delivery to the mobile station is effectuated by establishing a radio frequency communications link between a base station connected to that base station controller and the called mobile station.

In an alternative embodiment, the serving switching node responds to the routing request (provide roaming) message by identifying the base station controller currently serving the called mobile station (based perhaps on information resulting from a recent registration or paging attempt), and then assigning an appropriate one of the routing numbers (for example, a temporary location directory number or a roaming number) assigned to that base station controller. A response including the assigned routing number is then sent back to the originating switching node via the home location register and the visited switching node. The assigned routing number is then used to establish a trunk connection between the originating switching node and the base station controller by-passing the serving switching node. Completion of call delivery to the mobile station is effectuated by establishing a radio frequency communications link between a base station connected to that base station controller and the called mobile station.

Implementation of the trunk connection between the originating switching node and the base station controller in accordance with the present invention provides an operational advantage in some instances because a shorter distance communication may result and because a communication within a single LATA may result.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
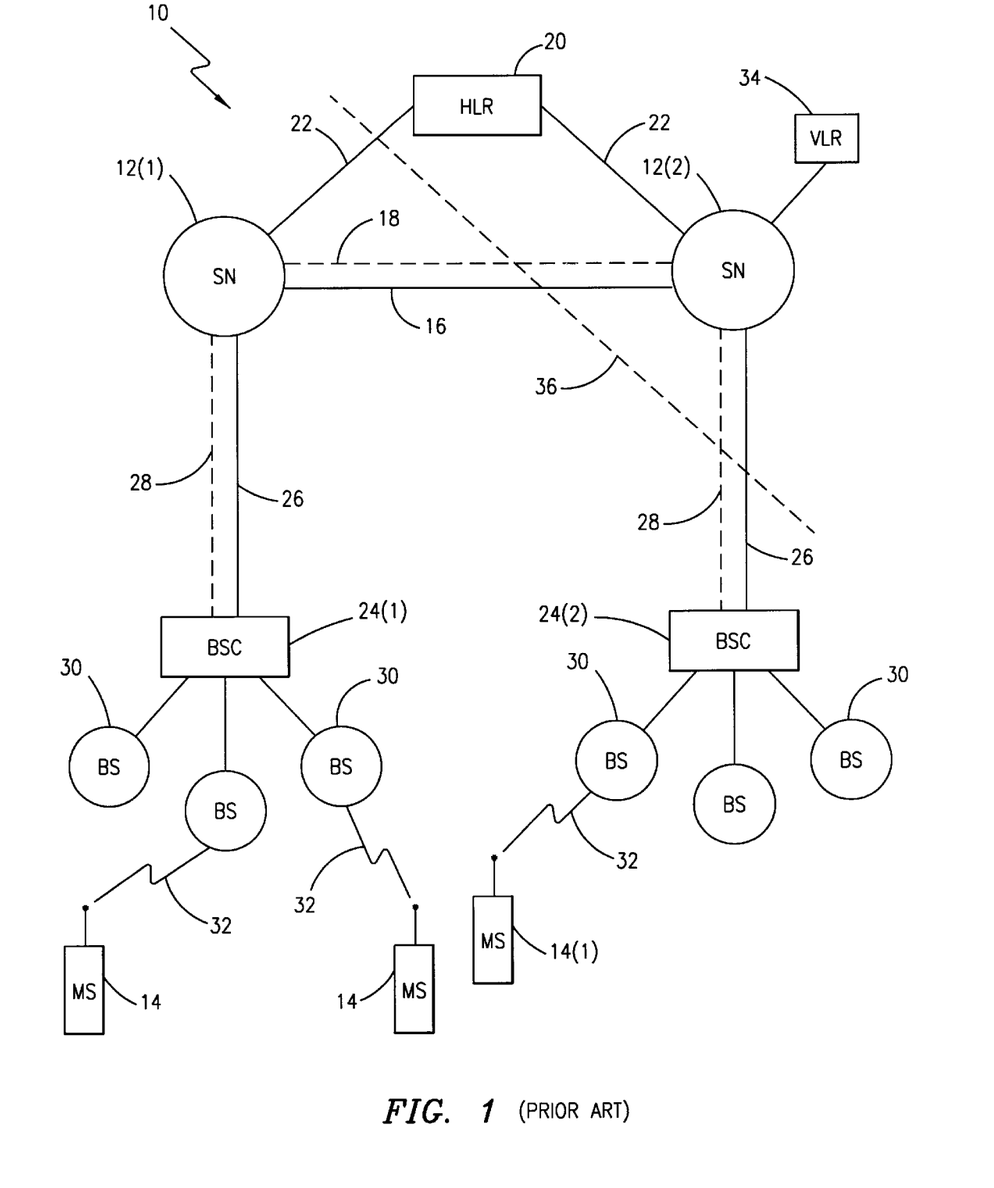
FIG. 1 is a schematic diagram of a cellular telephone network in accordance with the prior art.

Reference is now made to FIG. 1 wherein there is shown a schematic diagram of a cellular telephone network 10 including a plurality of interconnected switching nodes (SN) 12. Although only two switching nodes 12 are shown, it will be understood that the network 10 likely includes many more interconnected nodes. The first and second switching nodes 12(1) and 12(2) may comprise any one of a number of known telecommunications switching devices, including those commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14. The switching nodes 12 are also connected to a data base 20 comprising a home location register (HLR) by means of signaling links 22 providing a known Mobile Application Part (MAP) or IS-41 type connection. The data base 20 stores information concerning the mobile stations 14 comprising location information and service information. Each switching node 12 is further connected to at least one associated base station controller (BSC) 24 via both a signaling link 26 and a voice trunk 28. Only one base station controller 24 is shown connected to each switching node 12 in order to simplify the illustration. The voice trunk 28 provides a voice and data communications path used to carry subscriber communications between the first switching node 12(1) and its base station controller 24(1), and between the second switching node 12(2) and its base station controller 24(2). The signaling link 26 carries command signals between the node 12 and its associated base station controller 24. The signaling link 26 and trunk 28 are collectively commonly referred to in the art as the "A interface". Each base station controller 24 is connected to a plurality of base stations (BS) 30 which operate to effectuate radio frequency communications with proximately located mobile stations 14 over an air interface 32. The base station controller 24 functions in a well known manner to control this radio frequency communications operation.

Although direct communications links (signaling and/or trunk) are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the manner shown in FIG. 1 is therefore by way of simplification of the drawing.

Figure 2:
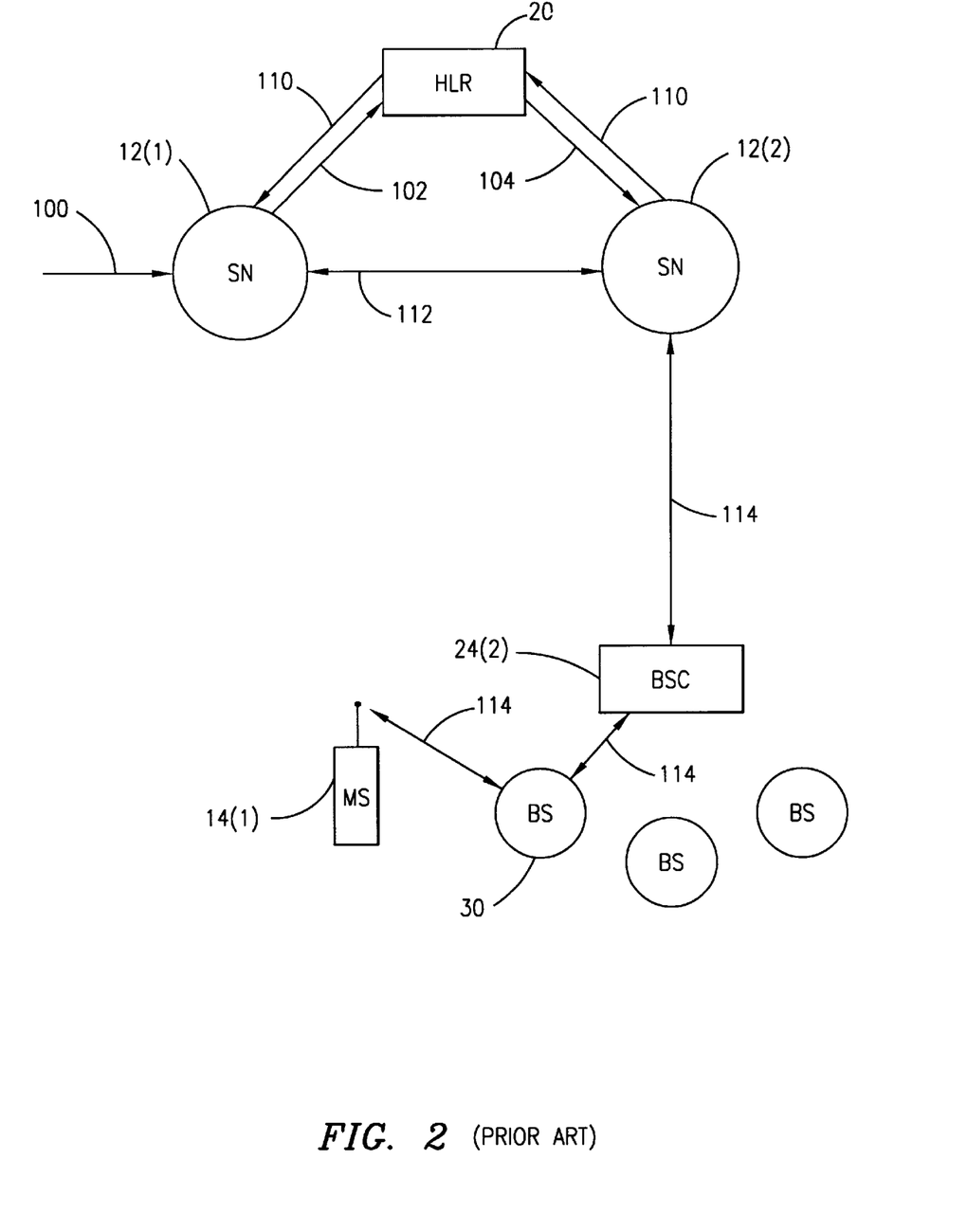
FIG. 2 is a schematic diagram of a cellular telephone network illustrating the flow of signals in connection with the prior art termination of an incoming call.
Figure 3:
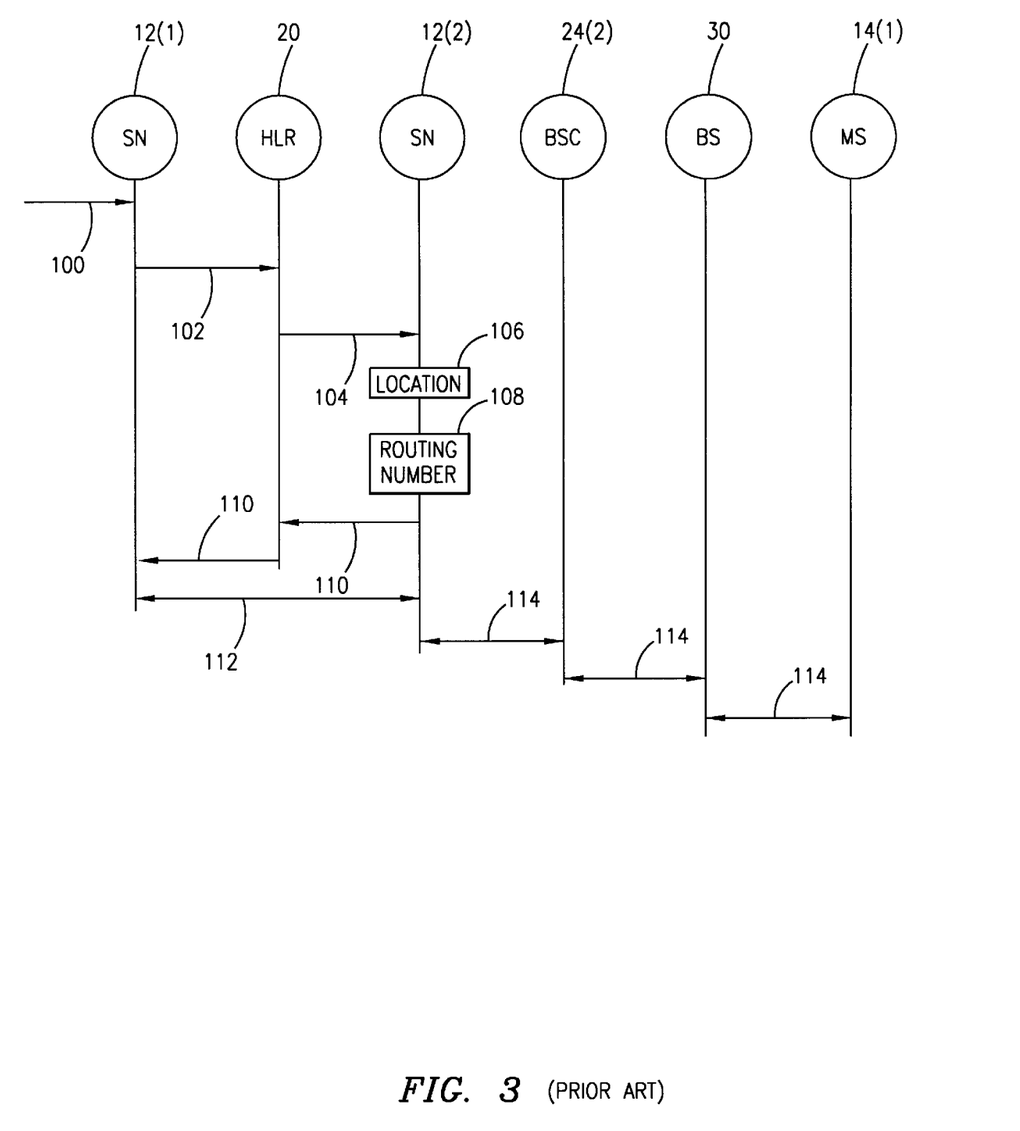
FIG. 3 is a signal flow and node operation diagram for the termination of the incoming call handled as illustrated in FIG. 2 in accordance with the prior art.

Reference is now made in combination to FIGS. 1, 2 and 3. FIG. 2 is a schematic diagram of the cellular telephone network 10 illustrating the flow of signals in connection with a specific example of the prior art termination of an incoming call. FIG. 3 is a signal flow and node operation diagram for the incoming call termination handled as illustrated in FIG. 2.

A call 100 dialed to the directory number (B-number) of mobile station 14(1) originates from another cellular subscriber or the public switched telephone network (PSTN) and is received at the first (originating or gateway) switching node 12(1). Using the signaling link 22, the originating switching node 12(1) interrogates the home location register data base 20 with a location request (send routing) message 102. The location request (send routing) message 102 is processed by the home location register data base 20 to determine the location (i.e., second or serving switching node 12(2)) within the cellular network 10 of the called mobile station 14(1). Responsive to this interrogation, the data base 20 signals the serving switching node 12(2) for the called mobile station 14(1) over signaling link 22 with a routing request (provide roaming) message 104 to prepare for the call. The serving switching node 12(2) then determines in action 106, to some selected degree of granularity, the location (for example, location area) of the called mobile station 14(1). This location may be identified, for example, based on information resulting from a most recent registration (not shown) of the called mobile station 14(1) as stored in a visitor location register (VLR) database 34 associated with the serving switching node 12(2). Alternatively, the serving switching node 12(2) may page (not shown) the called mobile station 14(1), and process the page response (not shown) to make a more precise location determination. In accordance with this determined location, the serving switching node 12(2) selects in action 108 an appropriate routing number (for example, a temporary location directory number (TLDN) or a roaming number) for that location (for example, taking in consideration LATA borders and other concerns). In this instance, the routing number is selected from a plurality of such numbers associated with the serving switching node 12(2). The selected routing number is then returned 110 to the originating switching node 12(1) via the home location register data base 20. The incoming call is then delivered (through connected) 112 over the voice trunk 18 using the routing number to the serving switching node 12(2) for attempted completion to the called mobile station 14(1). Completion of the call involves further routing 114 the incoming call over the voice trunk 28 to the proper base station controller 24, then to the currently serving base station 30, and then to the called mobile station 14(1) over the air interface 32.

It is recognized from the foregoing discussion and a review of FIGS. 2 and 3 that the call termination operation in accordance with the prior art requires the assignment and use of two voice trunks 18 and 28 in order to make a call connection between the originating switching node 12(1) and the base station controller 24. Advantages associated with a more efficient use of valuable network 10 trunk resources could be obtained with the establishment of a direct trunk connection between the originating switching node 12(1) and the base station controller 24 in connection with the call termination operation. "Direct" in this sense means only that the connection effectively by-pass the switching node 12(2). It does not necessarily means that only a single communications link is used between switching node 12(1) and base station controller 24. In this regard, FIG. 1 further illustrates the presence of a LATA border 36 extending across the links 16 and 18 as well as the links 26 and 28. Effectuation of a direct connection to the base station controller 24(2) may not be more direct (i.e., shorter) than the prior art connections, but also would advantageously not involve the crossing of the LATA border 36.

Figure 4:
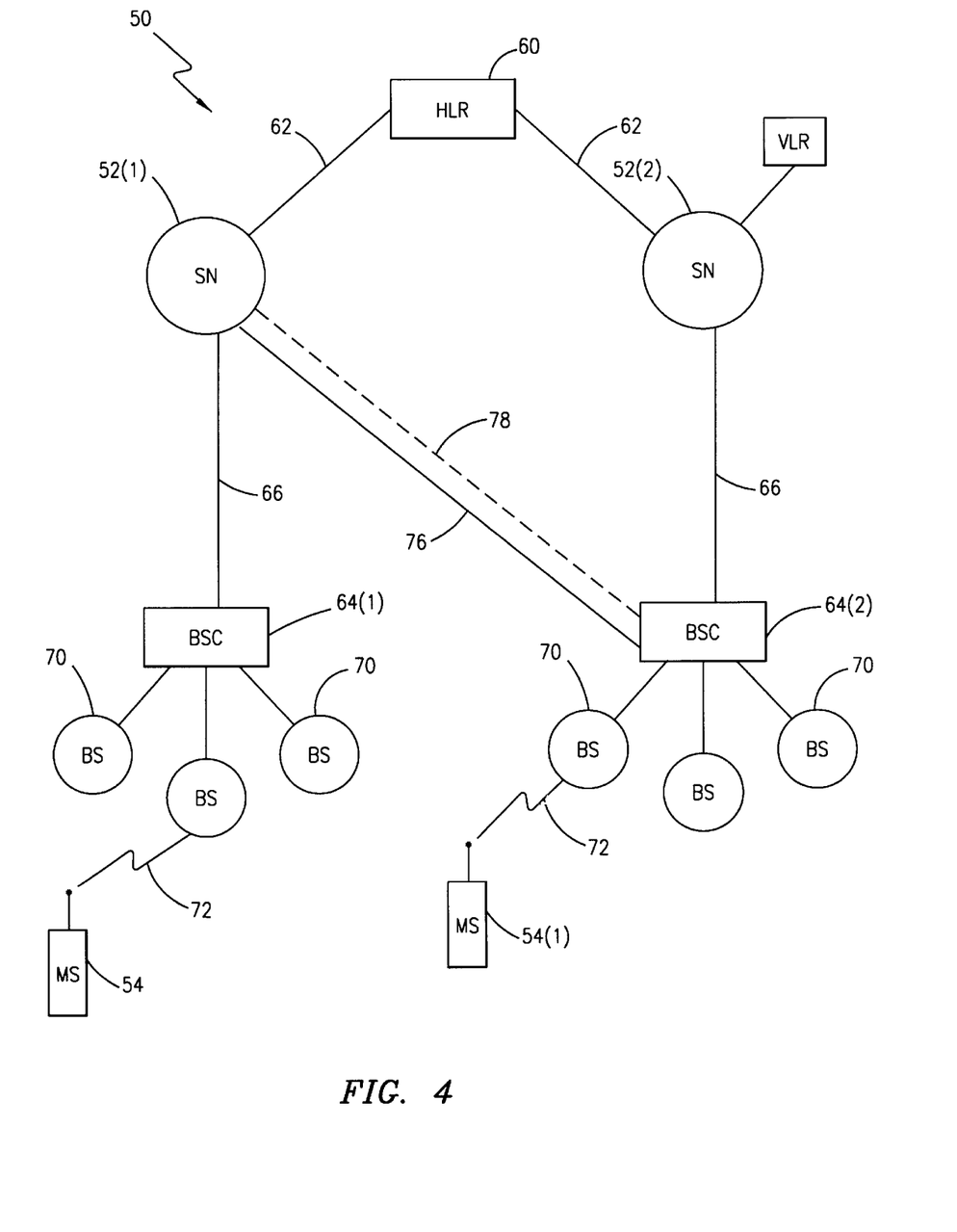
FIG. 4 is a schematic diagram of a cellular telephone network in accordance with the present invention.

Reference is now made to FIG. 4 wherein there is shown a schematic diagram of a cellular telephone network 50 including a plurality of interconnected switching nodes (SN) 52. Although only two switching nodes 52 are shown, it will be understood that the network 50 likely includes many more interconnected nodes. The first and second switching nodes 52(1) and 52(2), respectively, may comprise any one of a number of known telecommunications switching devices, including those commonly used and known in the art for providing either digital or analog cellular telephone service to a plurality of mobile stations (MS) 54. The switching nodes 52 may be interconnected with each other for communication via both signaling links and voice trunks (not illustrated to emphasize an advantage of the present invention). The first and second switching nodes 52(1) and 52(2) are also connected to a data base 60 comprising a home location register (HLR) by means of signaling links 62 providing a Mobile Application Part (MAP) or IS-41 type connection. The data base 60 stores information concerning the mobile stations 54 comprising location information and service information. Each switching node 52 is further connected to at least one base station controller (BSC) 64 via both a signaling link 66 and a voice trunk (not illustrated to emphasize another advantage of the present invention). Only one base station controller 64 is shown connected to each switching node 52 in order to simplify the illustration. The signaling link 66 carries command signals between the switching node 52 and its associated base station controller 64. The signaling link 66 and voice trunk (not shown) are collectively commonly referred to in the art as the "A interface". Each base station controller 64 is connected to a plurality of base stations (BS) 70 which operate to effectuate radio frequency communications with proximately located mobile stations 54 over an air interface 72. The base station controller 64 functions in a well known manner to control this radio frequency communications operation. The first switching node 52(1) is further connected to the base station controller 64(2) associated with the second switching node 52(2) by a voice trunk 78 and a signaling link 76 providing an ISUP (or R1 or R2) type connection. The voice trunk 78 provides voice and data communications paths used to carry subscriber communications between the first switching node 52(1) and the base station controller 64(2). The signaling link 76 carries command signals between the first switching node 52(1) and the base station controller 64(2). These signals may be used, for example, in setting up and tearing down voice and data communications links over the voice trunk 78. Additional signaling link 76 and voice trunk 78 connections (not shown) may exist in the network 50. The cellular telephone or Personal Communications Services (PCS) network 50 may comprise a Global System for Mobile (GSM) communications, an Advanced Mobile Phone System (AMPS), a digital Advanced Mobile Phone System (D-AMPS), a code division multiple access (CDMA) system, or the like.

Although direct communications links (signaling and/or trunk) are illustrated in FIG. 4, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the manner shown in FIG. 4 is therefore by way of simplification of the drawing.

Figure 5:
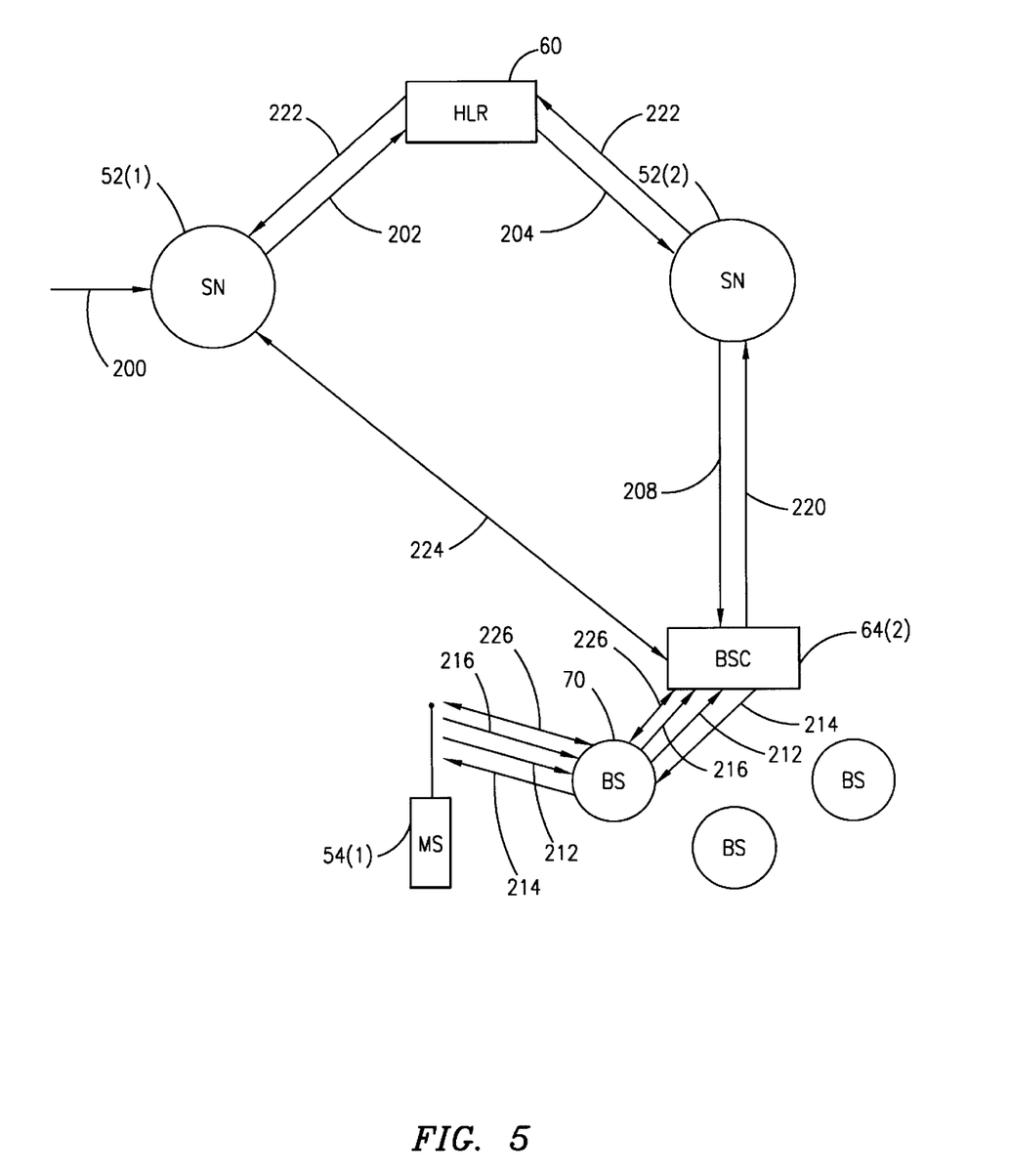
FIG. 5 is a schematic diagram of a cellular telephone network illustrating the flow of signals in connection with the termination of an incoming call in accordance with the present invention.
Figure 6:
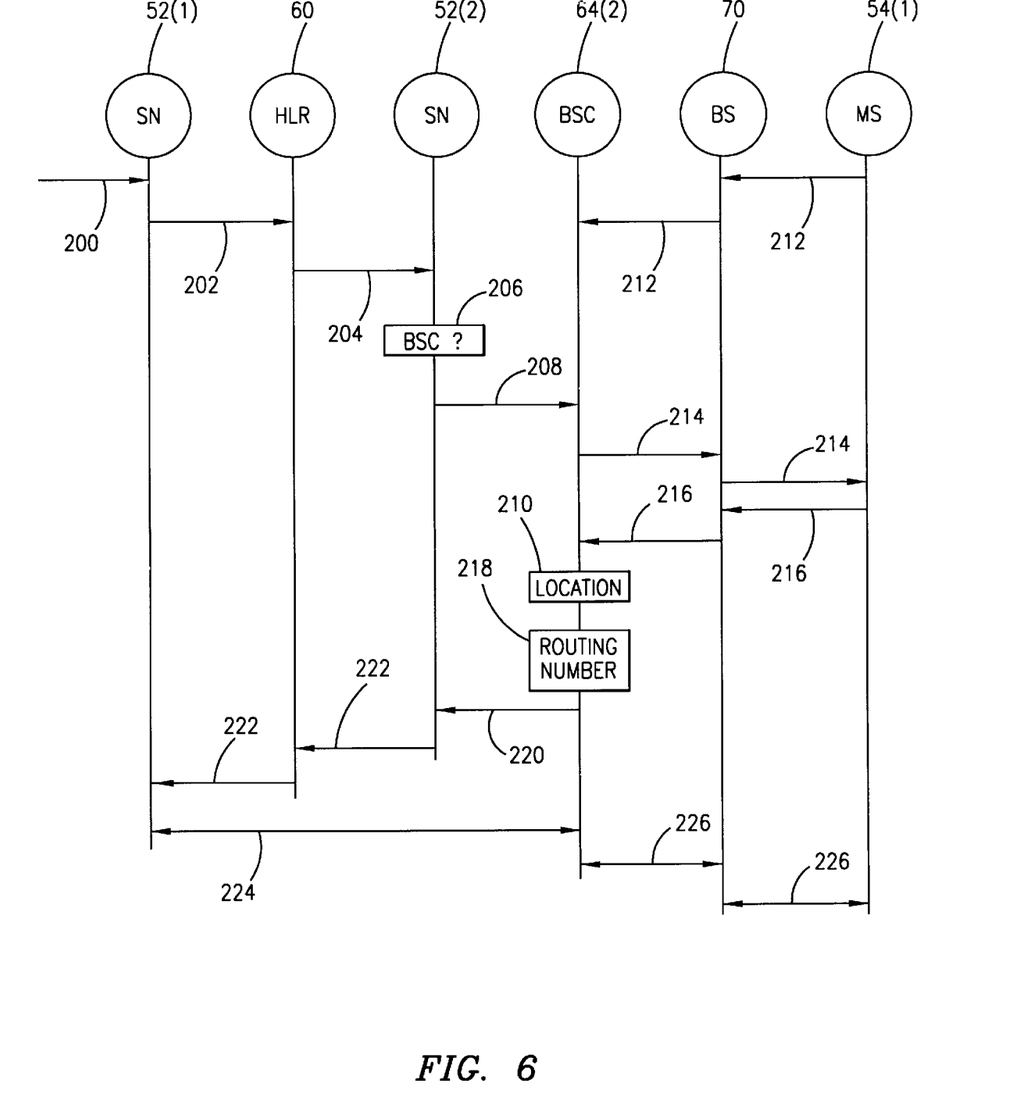
FIG. 6 is a signal flow and node operation diagram for the termination of the incoming call handled as illustrated in FIG. 5.

Reference is now made in combination to FIGS. 4, 5 and 6. FIG. 5 is a schematic diagram of the cellular telephone network 50 illustrating the flow of signals in connection with the termination of an incoming call in accordance with the present invention. FIG. 6 is a signal flow and node operation diagram for the incoming call termination handled as illustrated in FIG. 5.

A call 200 dialed to the directory number (B-number) of mobile station 54(1) originates from another cellular subscriber or the public switched telephone network (PSTN) and is received at the first (originating or gateway) switching node 52(1). Using the signaling link 62, the originating switching node 52(1) interrogates the home location register data base 60 with a location request (send routing) message 202. The location request (send routing) message 202 is processed by the home location register data base 60 to determine the location (i.e., second or serving switching node 52(2)) within the cellular network 50 of the called mobile station 54(1). Responsive to this interrogation, the data base 60 signals the serving switching node 52(2) for the called mobile station 54(1) over signaling link 62 with a routing request (provide roaming) message 204 to prepare for the call. The serving switching node 52(2) then determines in action 206 which base station controller 64(2) is currently serving the called mobile station 54(1). The routing request (provide roaming) signal 204 is then forwarded over the A interface 66 as a routing number request 208 to that base station controller 64(2). Responsive thereto, the base station controller 64(2) determines, to some selected degree of granularity, the location (for example, location area) of the called mobile station 54(1). This location may be determined in action 210, for example, based on the processing of information resulting from a most recent registration 212 of the called mobile station 54(1) Alternatively, the base station controller 64(2) may page 214 the called mobile station 54(1), and make a more precise location determination 210 based on a processing of the page response 216. In accordance with this determined location, the base station controller 64(2) selects in action 218 an appropriate routing number (for example, a temporary location directory number (TLDN) or roaming number) for that location (for example, taking in consideration LATA borders and other concerns). In this instance, the routing number is selected from a plurality of such numbers associated with the base station controller 64(2) rather than those numbers associated with the serving switching node 52(2) as in the prior art (see, FIGS. 1–3). The selected routing number (with associated parameters) is then returned 220 to the serving switching node 52(2). Responsive thereto, the serving switching node 52(2) returns 222 the selected routing number to the originating switching node 52(1) via the home location register data base 60. Using the selected routing number, the incoming call is then delivered (through connected) 224 over the voice trunk 78 to the base station controller 64(2) for attempted completion to the called mobile station subscriber 54(1). Completion of the call involves further connection 226 of the incoming call to the currently serving base station 70, and then to the called mobile station subscriber 54(1) over the air interface 72.

Figure 7:
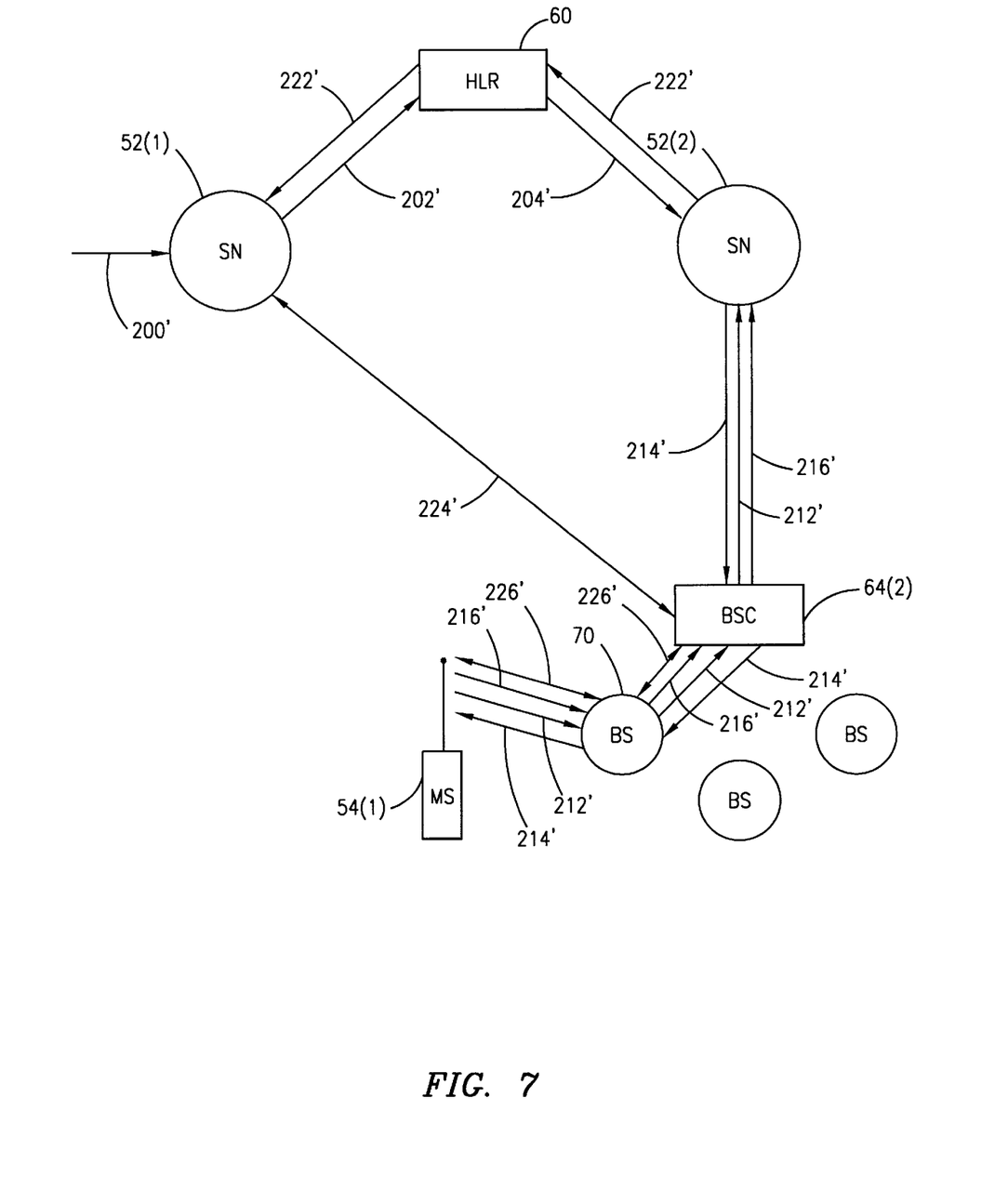
FIG. 7 is a schematic diagram of a cellular telephone network illustrating the flow of signals in connection with an alternative embodiment for the termination of an incoming call in accordance with the present invention.
Figure 8:
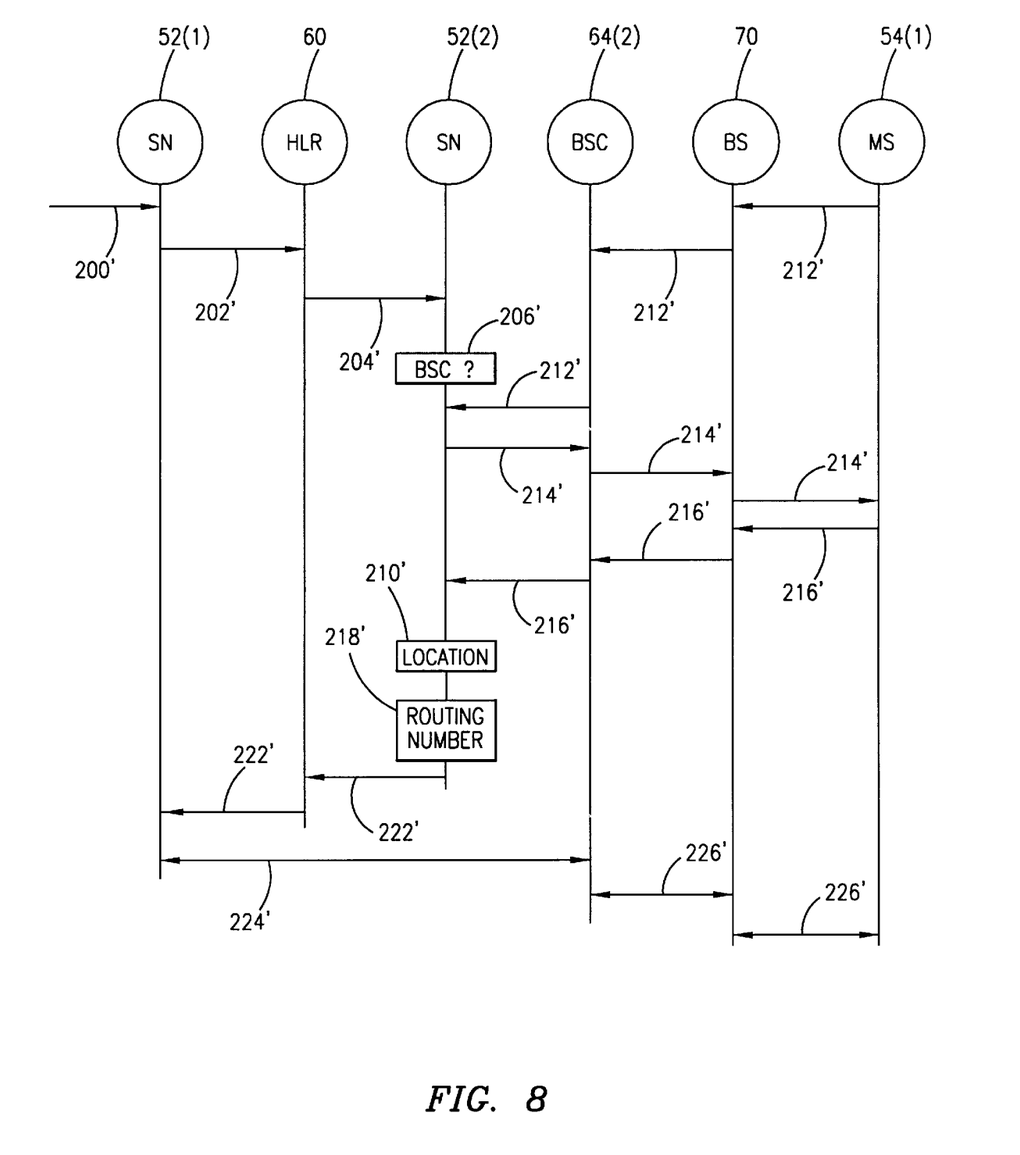
FIG. 8 is a signal flow and node operation diagram for the termination of the incoming call handled as illustrated in FIG. 7.

Reference is now made in combination to FIGS. 4, 7 and 8. FIG. 7 is a schematic diagram of the cellular telephone network 50 illustrating the flow of signals in connection with the termination of an incoming call in accordance with an alternative embodiment of the present invention. FIG. 8 is a signal flow and node operation diagram for the incoming call termination handled as illustrated in FIG. 7.

A call 200' dialed to the directory number (B-number) of mobile station 54(1) originates from another cellular subscriber or the public switched telephone network (PSTN) and is received at the first (originating or gateway) switching node 52(1). Using the signaling link 62, the originating switching node 52(1) interrogates the home location register data base 60 with a location request (send routing) message 202'. The location request (send routing) message 202' is processed by the home location register data base 60 to determine the location (i.e., second or serving switching node 52(2)) within the cellular network 50 of the called mobile station 54(1). Responsive to this interrogation, the data base 60 signals the serving switching node 52(2) for the called mobile station 54(1) over signaling link 62 with a routing request (provide roaming) message 204' to prepare for the call. The serving switching node 52(2) then determines in action 206' which base station controller 64(2) is currently serving the called mobile station 54(1). The serving switching node 52(2) then further determines, to some selected degree of granularity, the location (for example, location area) of the called mobile station 54(1). This location may be determined in action 210', for example, based on the processing of information resulting from a most recent registration 212' of the called mobile station 54(1). Alternatively, the serving switching node 52(2) may order the base station controller 64(2) to page 214' the called mobile station 54(1), and then make a more precise location determination 210' based on a processing of the page response 216'. In accordance with this determined location, the serving switching node 52(2) selects in action 218' an appropriate routing number (for example, a temporary location directory number (TLDN) or roaming number) for that location (for example, taking in consideration LATA borders and other concerns). In this instance, the routing number is selected from a plurality of such numbers associated with the base station controller 64(2) rather than those numbers associated with the serving switching node 52(2) as in the prior art (see, FIGS. 1–3). The selected routing number (with associated parameters) is then returned 222' to the originating switching node 52(1) via the home location register data base 60. Using the selected routing number, the incoming call is then delivered (through connected) 224' over the voice trunk 78 to the base station controller 64(2) for attempted completion to the called mobile station subscriber 54(1). Completion of the call involves further connection 226' of the incoming call to the currently serving base station 70, and then to the called mobile station subscriber 54(1) over the air interface 72.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for call delivery within a cellular telephone network including an originating switching node receiving an incoming call dialed to a mobile station, a serving switching node serving the called mobile station, and a base station controller connected to the serving switching node, the method comprising the steps of:
   transmitting a routing number request message to the base station controller;
   selecting by the base station controller of a routing number, that selected routing number comprising one of a plurality of routing numbers associated with the base station controller;
   transmitting the selected routing number from the base station controller back to the originating switching node; and
   utilizing the selected routing number for the base station controller to route the incoming call from the originating switching node to that base station controller for delivery to the called mobile station.

2. The method as in claim 1 wherein the routing number comprises a temporary location directory number.

3. The method as in claim 1 wherein the step of utilizing comprises the step of routing the incoming call from the originating switching node to the base station controller over a trunk connection.

4. The method as in claim 1 wherein the network further includes a home location register connected to the originating and serving switching nodes, and the step of transmitting the routing number request message comprises the steps of:
   transmitting a location request message from the originating switching node to the home location register;
   transmitting a routing request message from the home location register to the serving switching node; and
   transmitting a routing number request from the serving switching node to the base station controller.

5. The method as in claim 4 wherein the step of transmitting the location request message further includes the step of identifying by the home location register of the serving switching node as currently serving the called mobile station.

6. The method as in claim 4 wherein the step of transmitting the routing request message further includes the step of identifying by the serving switching node of the base station controller currently serving the called mobile station.

7. The method as in claim 1 wherein the step of selecting comprises the steps of:
   identifying a location of the called mobile station; and
   choosing based in part of the identified location a routing number from the plurality of routing numbers associated with the base station controller.

8. The method as in claim 7 wherein the step of identifying comprises the step of paging the called mobile station to determine its location.

9. The method as in claim 7 wherein the step of identifying comprises the step of processing a prior registration by the called mobile station to determine its location.

10. A method for call delivery within a cellular telephone network including an originating switching node receiving an incoming call dialed to a mobile station, a serving switching node serving the called mobile station, and a base station controller connected to the serving switching node, the method comprising the steps of:
    transmitting a routing number request message to the serving switching node;
    selecting by the serving switching node of a routing number, that selected routing number comprising one of a plurality of routing numbers associated with the base station controller;
    transmitting the selected routing number from the serving switching node back to the originating switching node; and
    utilizing the selected routing number for the base station controller to route the incoming call from the originating switching node to that base station controller for delivery to the called mobile station.

11. The method as in claim 10 wherein the routing number comprises a temporary location directory number.

12. The method as in claim 10 wherein the step of utilizing comprises the step of routing the incoming call from the originating switching node to the base station controller over a trunk connection.

13. The method as in claim 10 wherein the network further includes a home location register connected to the originating and serving switching nodes, and the step of transmitting the routing number request message comprises the steps of:
    transmitting a location request message from the originating switching node to the home location register; and transmitting a routing request message from the home location register to the serving switching node.

14. The method as in claim 13 wherein the step of transmitting the location request message further includes the step of identifying by the home location register of the serving switching node as currently serving the called mobile station.

15. The method as in claim 13 wherein the step of transmitting the routing request message further includes the step of identifying by the serving switching node of the base station controller currently serving the called mobile station.

16. The method as in claim 10 wherein the step of selecting comprises the steps of:

identifying a location of the called mobile station; and choosing based in part of the identified location a routing number from the plurality of routing numbers associated with the base station controller.

17. The method as in claim 16 wherein the step of identifying comprises the step of paging the called mobile station to determine its location.

18. The method as in claim 16 wherein the step of identifying comprises the step of processing a prior registration by the called mobile station to determine its location.

19. A cellular telephone network, comprising:

an originating switching node receiving an incoming called dialed to a mobile station;

a serving switching node currently serving the called mobile station;

a base station controller connected to the serving switching node for controlling radio frequency communications with the called mobile station, the base station controller being associated with a plurality of routing numbers;

a trunk connection between the originating switching node and the base station controller; and means for routing the incoming call from the originating switching node to the base station controller over the trunk connection using a selected one of the base station controller routing numbers for delivery to the called mobile station.

20. The network as in claim 19 wherein the means for routing comprises:

means for identifying a routing number, that selected routing number comprising one of the plurality of routing numbers associated with the base station controller; and means for communicating that selected routing number to the originating switching node for use in routing the incoming call from the originating switching node to the base station controller over the trunk connection.

21. The network as in claim 20 wherein the means for identifying comprises means for determining a location of the called mobile station, the routing number selected based in part on the determined location.

22. The network as in claim 21 wherein the means for determining a location comprises means for processing a prior called mobile station registration to identify called mobile station location.

23. The network as in claim 21 wherein the means for determining a location comprises means for paging the mobile station and processing a page response to identify called mobile station location.

24. The network as in claim 20 wherein the means for identifying comprises:

means for transmitting a routing number request message to the serving switching node, the serving switching node making the selection of the routing number from the plurality of routing numbers associated with the base station controller.

25. The network as in claim 20 wherein the means for identifying comprises:

means for transmitting a routing number request message through the serving switching node to the base station controller, the base station controller making the selection of the routing number from the plurality of routing numbers associated with the base station controller.

26. The network as in claim 19 wherein the routing number comprises a temporary location directory number.

\* \* \* \* \*